C. FRANKE.
Method or Process of Heating Buildings.
No. 167,395. Patented Sept. 7, 1875.
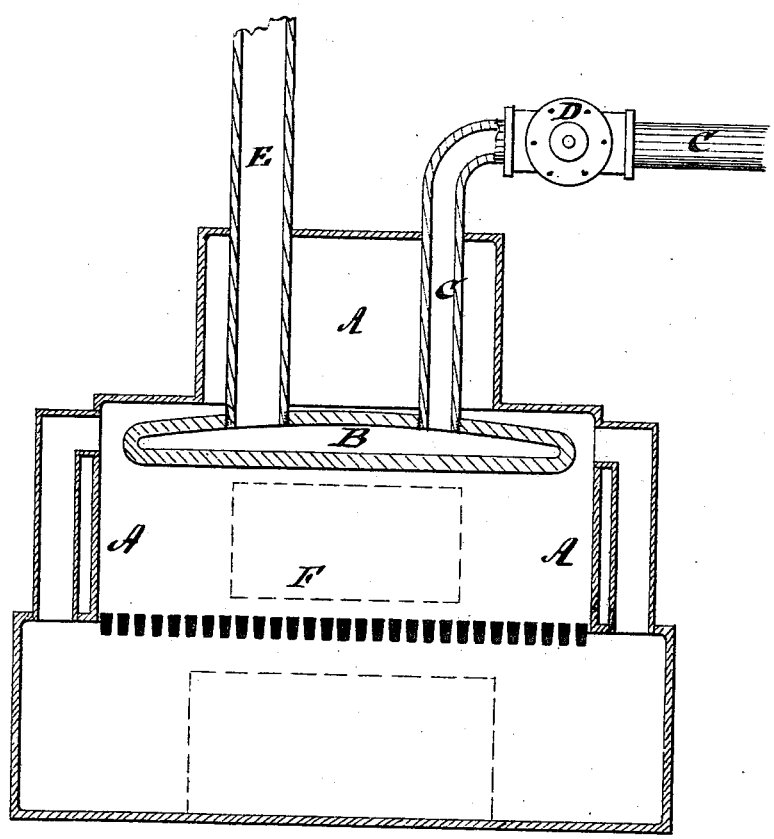
Witnesses
W. Heuermann
John Stock
Inventor.
Charles Franke
per Henry E. Roeder
Attorney

UNITED STATES PATENT OFFICE.

CHARLES FRANKE, OF NEW YORK, N. Y.

IMPROVEMENT IN METHODS OR PROCESSES OF HEATING BUILDINGS.

Specification forming part of Letters Patent No. 167,395, dated September 7, 1875; application filed May 22, 1874.

*To all whom it may concern:*

Be it known that I, CHARLES FRANKE, of New York, in the county of New York and State of New York, have invented an Improvement in the Method or Process of Heating Buildings; and I do hereby declare that the following is a full and exact description thereof, reference being had to the accompanying drawing, representing a central vertical section of a heating apparatus by which I apply my improved method of heating.

My improvement consists in a method or process of combining hot air and steam in proper proportions, and admitting them thus combined into the apartments to be heated, the proportion of steam and hot air being adjustable at pleasure, whereby the excessive dryness of the air usually supplied from hot-air furnaces is avoided, and a pleasant, healthful condition of air is produced in the apartments, substantially as herein specified.

In the drawing, A represents the hot-air chamber; B, the steam-generating chamber; C, a pipe for supplying water to the steam-generating chamber; D, a cock or valve for regulating the quantity of water admitted into the steam-generating chamber in a given time; E, one of any desired number of pipes or outlets to conduct the steam generated in the chamber B to the hot-air flues; and F, the fire-chamber, which furnishes the heat for generating the steam and producing the hot air. The furnace or fire-chamber F and hot-air-distributing chamber A may be of any ordinary or desired construction. The steam-generating chamber B is situated close over or near to the fire, and is broad, thin, or flat, and close, whereby the steam is rapidly generated, and none of it wasted except for its legitimate or designed use.

It is essential to the proper working of this method of heating that the amount of steam generated in a given time should be under complete control. Therefore it is impracticable to have a quantity of water held in store in the steam-generating chamber to be subjected to the excess or deficiency of heat produced in the fire-chamber F, always so subject to variation. Hence it is an essential part of my method or process that the steam-producing water shall be admitted into this chamber only as fast as it will be immediately converted into steam at any time while the furnace is in action. To effect this I employ a cock or valve, D, which admits the water from a water-pipe or other source of water-supply, whereby the water is allowed to enter the chamber B only by regular dropping or a small stream. This cock or valve is constructed in any suitable manner, so that by it the rate of admitting the water is readily adjustable to a greater or less degree, just as desired. As the steam leaves the generating-chamber it escapes through the pipes E, distributing itself evenly in the different hot-air pipes which lead to the several apartments. Thus the purpose is accomplished by very simple and very effectual means.

What I claim as my invention, and desire to secure by Letters Patent, is—

The within-described method or process of heating buildings, consisting in combining with the hot air produced in a furnace steam generated in a dry chamber, B, into which the steam-producing water is admitted in regulated quantity only as fast as required for generating the desired proportion of steam, supplying the said combined hot air and steam to the several apartments to be heated, substantially as and for the purpose herein specified.

CHARLES FRANKE.

Witnesses:
 HENRY E. ROEDER,
 JOHN STACK.